Figure 1:
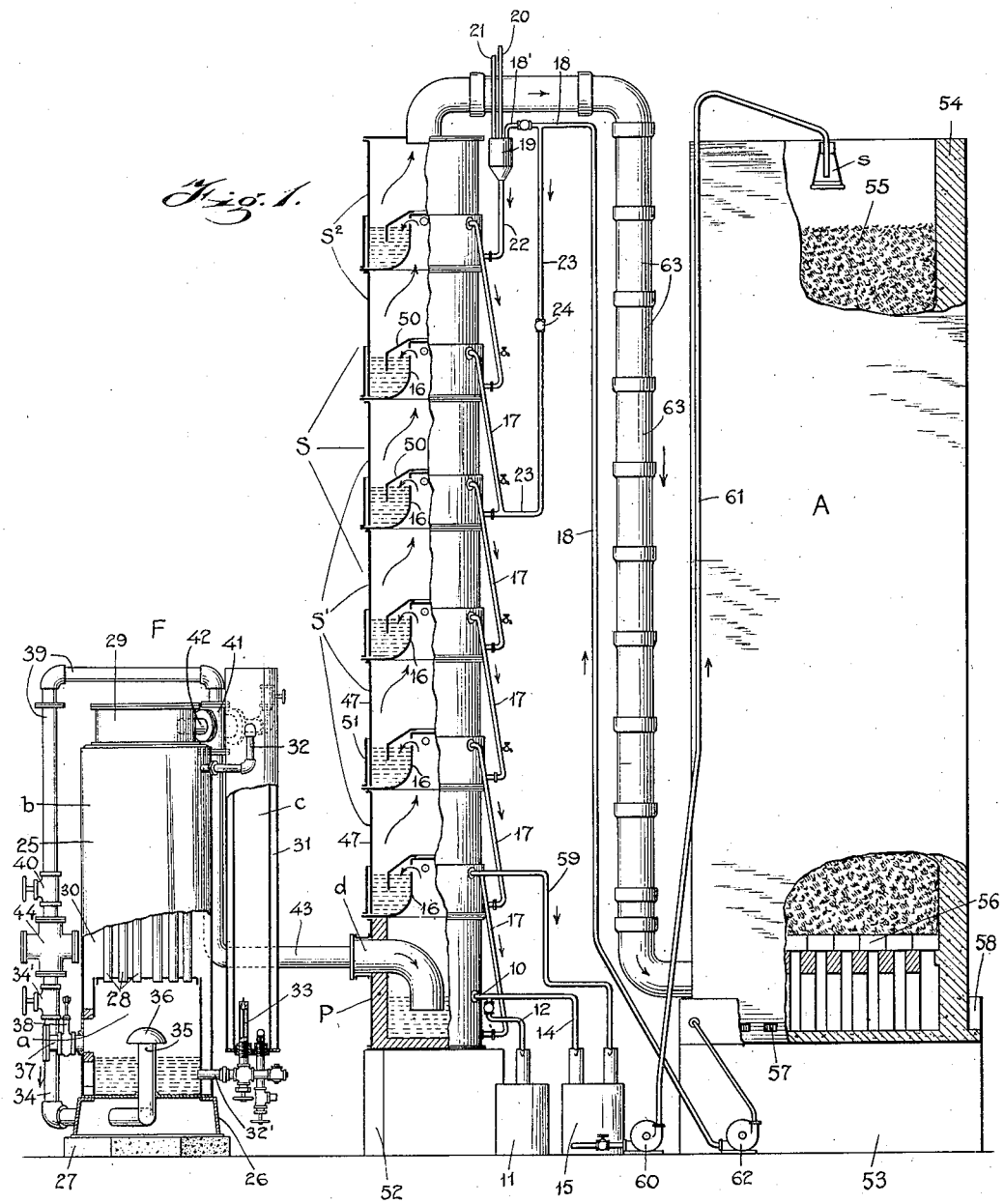

Nov. 4, 1924.  
I. HECHENBLEIKNER ET AL  
1,513,903  
METHOD OF AND APPARATUS FOR PRODUCING SULPHURIC ACID  
Filed Dec. 20, 1923  2 Sheets-Sheet 1

INVENTORS  
INGENUIN HECHENBLEIKNER  
AND PETER S. GILCHRIST  
BY  
Meyers & Cavanagh  
ATTORNEYS

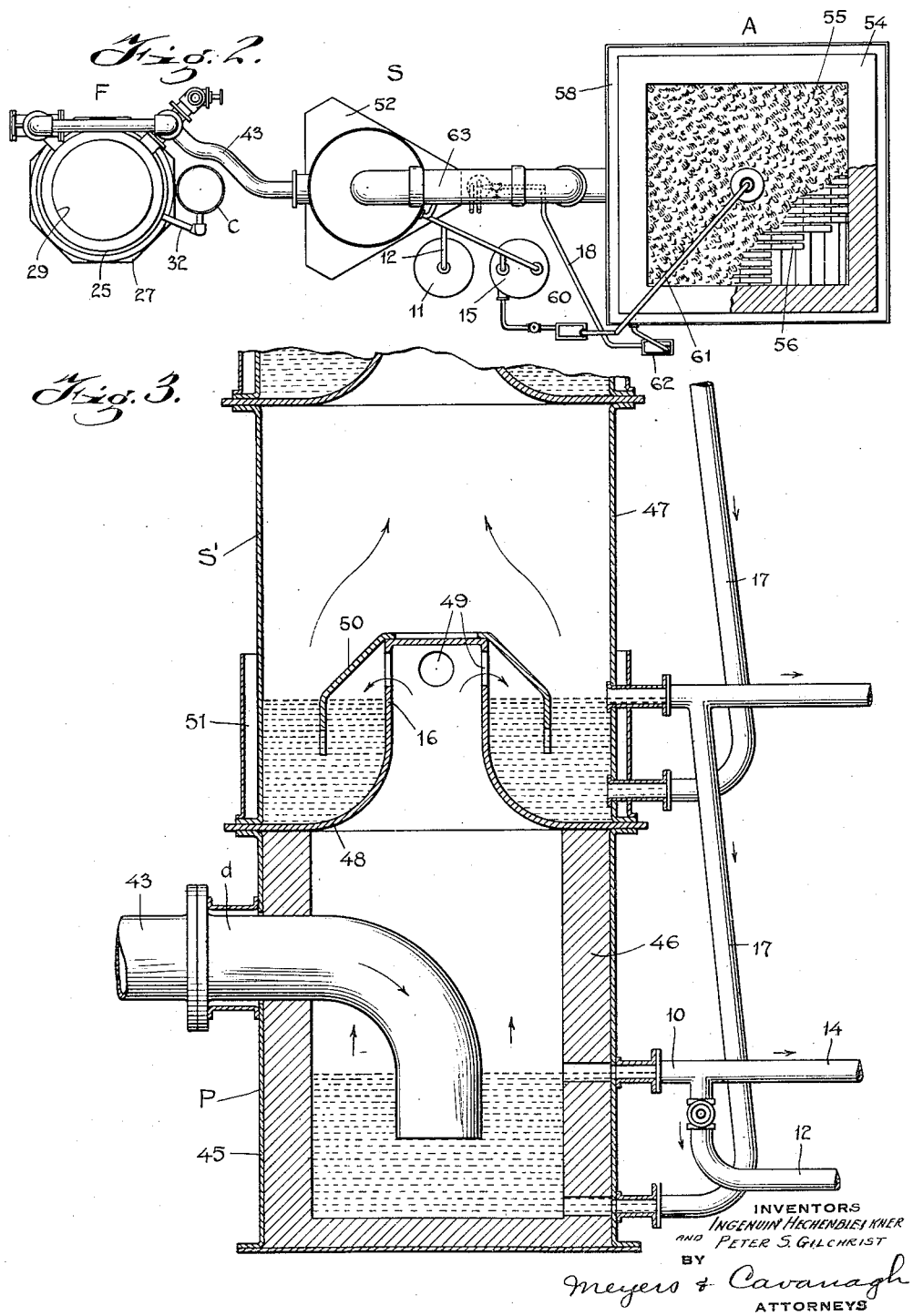

Patented Nov. 4, 1924.

1,513,903

UNITED STATES PATENT OFFICE.

INGENUIN HECHENBLEIKNER AND PETER S. GILCHRIST, OF CHARLOTTE, NORTH CAROLINA, ASSIGNORS TO CHEMICAL CONSTRUCTION COMPANY, OF NEW YORK, N. Y., A CORPORATION OF NORTH CAROLINA.

METHOD OF AND APPARATUS FOR PRODUCING SULPHURIC ACID.

Application filed December 20, 1923. Serial No. 681,731.

*To all whom it may concern:*

Be it known we, INGENUIN HECHENBLEIKNER and PETER S. GILCHRIST, citizens of the United States, and residents of Charlotte, in the county of Mecklenburg and State of North Carolina, have invented certain new and useful Improvements in Methods of and Apparatus for Producing Sulphuric Acid, of which the following is a specification.

This invention relates to the manufacture of sulphuric acid, and relates more particularly to an improved method of and apparatus for producing sulphuric acid in which the gases and liquids are intimately commingled under pressure to produce intensified reactions.

It has long been proposed to produce sulphuric acid by reacting sulphur dioxide gas with nitrous acid for denitrifying the latter, the gas being brought into intimate contact with the acid by forcing the same under pressure through the acid and releasing the gas underneath the surface of the acid in a finely divided state so that the molecules of gas and acid are intimately commingled to increase the time and surface and hence intensity of reaction.

This principle of intensified reaction is usually employed in the primary or denitrifying stage, as also in secondary stages of the sulphuric acid manufacture process, and may if desired be utilized in the absorption stage of the process, the method being carried out by first bubbling the sulphur dioxide gas through a primary or denitrating reaction chamber containing nitrous acid, the excess or uncondensed sulphur dioxide gas intermixed with the nitric oxide gases comprising nitrogen trioxide ($N_2O_3$), nitric oxide ($NO$), and nitrogen peroxide ($NO_2$), liberated in the primary reaction chamber being then bubbled through one or more secondary reaction chambers containing nitrous acid. In the secondary reaction chambers, the nitrous acid is converted by sulphur dioxide gas into sulphuric acid, and the completion of the reactions is effected in the primary or denitrifying chamber, the sulphur dioxide gases being thus progressively absorbed or condensed by the successive treatment in the reaction chambers; and the residual gases containing the nitrogen compounds are treated in an absorption system where the said compounds are salvaged or absorbed by treatment with strong sulphuric acid.

By employing the intensified reactions in the primary and secondary reaction chambers, it is possible to control the process with facility, and to effect the rapid reaction between the gases and the liquids; and the mixture of the gases above the liquid level is also very intensified and is under pressure and creates an ideal condition for quick reaction so that the process may be carried on in a much smaller plant space than in the ordinary chamber system, thereby greatly reducing the size of the plant and the cost of installation and upkeep of the same. We have discovered that the size of the plant may be materially reduced and the process carried on with greater dispatch and under better control by subjecting the excess sulphur dioxide gases unabsorbed in the primary reaction chamber to treatment in the secondary reaction chambers in such a manner as to effect the more rapid and more complete condensing of this gas. More specifically, we have empirically determined that when the secondary reaction chambers are divided into two sets, each set containing one or more individual chambers, and when the said sets are connected in series and charged with different concentrations of nitrous acid, the first set of the series containing a strong or concentrated nitrous acid and the second set of the series containing a weaker or diluted nitrous acid, the excess sulphur dioxide gas may be passed in serial succession through the reaction chambers so that the bulk of the excess is condensed or absorbed in the first set of reaction chambers containing the stronger nitrous acid and the residual and very weak sulphur dioxide is more rapidly and expeditiously condensed in the second set of reaction chambers containing the weaker nitrous acid. The provision of this improved process and the apparatus and plant with which the said improved process may be practiced is a principal desideratum of our present invention.

We have further found that the size of the plant and its cost of construction may be still further reduced by effecting the concentration of the sulphuric acid in the denitrifying stage of the process, and this may be accomplished by efficiently inter-relating the apparatus for generating the sulphur dioxide gas with the denitrifying reaction chamber, and by controlling the supply and temperature of the gases circulating from the generating apparatus to the denitrifying or primary reaction chamber; and the provision of a method and an apparatus for accomplishing these results is a further object of our invention.

To the accomplishment of the foregoing and such other objects as may hereinafter appear, our invention consists in the process, the steps of the process, in the elements and the apparatus, and their relation one to the other, as hereinafter particularly described and sought to be defined in the claims; reference being had to the accompanying drawings which show a preferred embodiment of our invention, and in which:

Fig. 1 is an elevational view partly shown in section and with parts broken away, of the complete sulphuric acid producing plant of our invention, Fig. 2 is a plan view thereof, and Fig. 3 is an enlarged fragmentary view taken in cross-section of the primary and secondary reaction chambers of the apparatus.

Before describing our invention in detail, it may be briefly premised that in carrying out the steps of the process, sulphur dioxide gas is generated in the sulphur burning surface F, the sulphur dioxide gas being introduced into a denitrifying or primary reaction chamber P, the gas being passed under pressure below the surface of the acid bath in this chamber, the excess sulphur dioxide gas intermixed with the nitrogen compounds liberated in the primary reaction chamber being then passed under pressure in serial succession through the acid baths contained in a plurality of secondary reaction chambers S as indicated by the arrows in Fig. 1, the nitrogen compounds produced in all of the reaction chambers being then conducted into an absorption apparatus A which may comprise the conventional Gay-Lussac tower in which the nitric oxide gases are absorbed by concentrated sulphuric acid.

The acids for reacting with the gases are circulated counter-current or in counter direction to the circulating gases, the concentrated sulphuric acid being sprayed into the absorption tower A by means of the usual spraying apparatus $s$ and the nitrous acid or the mixture of nitrososulphuric and sulphuric acids obtained in the absorption system are conducted into the secondary reaction chambers S, where they are mixed with nitre and water and circulated in serial succession from the last of the secondary reacting chambers to the primary reaction chamber, the completion of the reactions and the production of the final sulphuric acid being obtained in the primary chamber.

In carrying out our improved process, the secondary reaction chambers S are divided into two sets or groups S' and $S^2$, each set consisting of one or more individual chambers, the first set S' being supplied, as will be described more in detail hereinafter, with a concentrated acid mixture, and the second set $S^2$ being supplied with a diluted acid mixture for effecting the more rapid condensation of the sulphur dioxide gas and the more intensified sulphuric acid producing reactions.

As heretofore mentioned, in the practice of the process the concentration of the sulphuric acid is effected in the denitrifying or primary reaction chamber P so that the usual and expensive Glover tower may be dispensed with. To this end we preferably pre-cool and control the character and flow of the gas entering the denitrifying chamber, and in the preferred practice of the invention this is accomplished by the furnace F having a combustion chamber $a$ where sulphur dioxide gases are produced, and a cooling means $b$ in the form of a boiler wherein the temperature of the gases is lowered, the interchange of heat being used for producing steam for melting the sulphur contained in a sulphur melting chamber $c$ and for producing steam power for operating the plant. The pre-cooled gas is commixed with air and the character and flow of the intermixed gases are controlled by means hereinafter to be described more in detail, the gases, having a percentage of sulphur dioxide from traces to approximately 10% as desired, being led to the primary reaction chamber through the gas inlet or pipe $d$ and beneath the level of the acid bath in the chamber for intimate reaction therewith, the heat radiation from the gases to the acid resulting from the heat of reaction being just sufficient to effect the absorption of the moisture from the acid, thereby causing it to concentrate during denitrification.

The concentrated and denitrified sulphuric acid produced in the primary chamber P overflows in the acid outlet 10, part of this acid which represents the "make" being led into a collecting receptacle 11 through the pipe 12 from which receptacle it may be conducted to the usual storage receptacles; and part of the finished acid is led through the pipe 14 to a receptacle 15 for further circulating use in the system.

The primary and secondary reaction chambers are connected preferably in series or cascade for both gas and liquid intercommunication each of the secondary reaction chambers being provided with a gas duct 16 connecting the chamber with the one immediately therebelow in the series, and each of the chambers being also provided with an acid duct 17 connecting the chamber with the one immediately thereabove in the series, the gas and acid flow through these ducts being in opposite directions, as indicated by the arrows in Fig. 1 of the drawings.

The secondary reaction chambers are charged with the acid mixtures, and as heretofore mentioned, the last reaction chamber of the series and the top of the second set $S^2$ is charged with a diluted mixture of nitrous acid obtained preferably from the absorption system, this being accomplished by conducting the nitrous acid from the absorption tower A through a conducting pipe 18 in the direction indicated by the arrow and into a branch pipe 18' entering a mixing chamber 19, into which mixing chamber are introduced water through a pipe 20 and nitre through a pipe 21, the nitre being added as a gas from the ordinary nitre potting system, or as nitric acid or nitrous acid or nitre solution, as is customary in the ordinary acid plant. The mixture of diluted nitrous acid and nitre moves from the mixing chamber 19 through the acid inlet 22 and enters the topmost reaction chamber, the strength of the sulphuric acid in this chamber being in the preferred practice from 40° to 50° Baumé.

For introducing the more concentrated nitrous acid into the first set S' of the secondary reaction chambers, some of the nitrous acid conducted through the pipe 18 is led through the acid inlet 23 and controlled by means of a valve 24 into the topmost of the first set S' of the reaction chambers, the concentration of the acid in such chamber being preferably from 58° to 60° Baumé.

By the provision of this means, the bulk of the excess of sulphur dioxide uncondensed by the primary reaction is absorbed by the stronger sulphuric acid mixture in the first set of secondary reaction chambers, the residual sulphur dioxide gas which is best absorbed by a weaker sulphuric acid solution being appropriately treated by the weaker acid mixture in the second set of the secondary reaction chambers. While the secondary reaction chambers are thus subdivided, it will be understood that the liquids move in serial succession from the second set to the first set of the secondary reaction chambers and thence to the primary reaction chamber through the ducts 17. It will be understood, moreover, that while we prefer to interconnect the chambers of each set of the secondary reaction chambers in series, these may be connected in parallel or in series-parallel as may be desired.

Describing now more in detail the apparatus employed in the practice of the process, the furnace F which includes the combustion chamber $a$ and the boiler $b$ may comprise an outer cylindrical structure 25 provided with a base 26 and planted on a foundation 27, the cylindrical structure being subdivided into the compartment or combustion chamber $a$ communicating by means of a plurality of pipe sections 28 with a hood 29 and a chamber or space 30 surrounding the pipes 28 and partly surrounding the chamber $a$, in which space steam is generated by the heat interchange. Associated with the furnace there is provided the sulphur melting chamber $c$, the latter being provided with a steam jacket 31 connected by means of the pipe 32 to the steam chamber 30 of the furnace, so that part of the regenerated heat may be utilized for melting the sulphur in the chamber $c$, the melted sulphur being led into the combustion chamber $a$ through a sulphur inlet 32', the flow of the same being controlled preferably by the needle valve 33.

For oxidizing the sulphur and for controlling the character of gases produced, we preferably provide a plurality of sources of oxidizing fluid, a primary oxidizing fluid being introduced under pressure into the pipe 34 and controlled by valve 34', which pipe has an extension 35 projecting into the chamber $a$ and above the level of sulphur therein, the said extension being provided with a deflecting hood 36 for deflecting the primary source of air downwardly onto the sulphur level. A secondary source of oxidizing medium such as air is introduced through the connection 37 which may be controlled by the valve 38 to effect the desired intermixture of the secondary gas with the gases of combustion. For further controlling the character and flow of the gases, we prefer to mix the pre-cooled gases with a tertiary supply of air which is conducted under pressure to and through the pipes 39 controlled by the valve 40, the horizontal branch of the pipes 39 being connected to a mixing chamber 41 into which flow the precooled gases from the hood 29 through the pipe 42, the gas intermixture then moving under pressure through the connecting pipe 43 to the gas inlet $d$ heretofore described. The air introduced at the various parts of the furnace may be obtained from a single source connected to the T or cross common connection 44.

The primary reaction chamber P preferably comprises a lead sheath or housing 45 (see Fig. 3) interiorly lined as at 46 with acid-proof brick, into which projects the inlet pipe $d$ made of iron, said pipe being submerged below the surface of the acid bath. Each of the secondary reaction chambers comprises a lead casing or sheath 47 provided with a lead base 48, the said base being cast to provide the gas duct 16 in the upper end of which are the circumferentially spaced gas ports 49, the said duct being capped by a hood 50 submerged in the acid bath of the chamber, so that the gas under pressure is caused to move through the ports 49, under the hood, and into the acid bath. Each of the secondary reaction chambers may if desired be further provided with connections for cooling so as to regulate the temperature of the acid bath therein, and to this end each of the chambers may be provided with the water jacket 51. The stacked reaction chambers may be securely planted upon the concrete foundation 52.

The absorption system in the embodiment of the invention illustrated comprises the conventional Gay-Lussac tower, although it will be understood that in place of the Gay-Lussac tower a series of absorption reaction compartments similar to the secondary reaction chambers may be provided. The absorption tower A may also be arranged upon a concrete foundation 53, and comprises a brick structure 54 packed with coke or the like 55 supported on the grate 56, the bottom of the tower having a plurality of ports 57 opening into an annular collecting chamber 58. The concentrated sulphuric acid which is admitted into the absorption tower is taken from the collecting receptacle 15, which acid may be a mixture of the sulphuric acid obtained in the primary reaction chamber and of part of the nitrous acid obtained in the next succeeding reaction chamber and drawn therefrom through the pipe connection 59, this acid mixture being elevated by means of the acid lift or circulating pump 60 through the conducting line 61 and delivered to the spraying device $s$. The nitrous acid obtained in the absorption tower collecting in the annular chamber 58 is elevated by means of the acid lift 62 through the conducting pipe 18 for introduction to the sets of secondary reaction chambers, as heretofore explained. The means for conducting the nitrogen compounds from the reaction chambers to the absorption system may comprise the connected pipe sections 63.

The operation of the plant will in the main be apparent from the above description thereof. Nitrous gases obtained in the reaction chambers pass up through the tower packing 55 where they come in contact with a downflow of strong sulphuric acid, the strong sulphuric acid absorbing the nitre out of the gases, as is well known, for forming nitrous acid, and the remaining gases freed from the nitrogen compounds pass out to the atmosphere. The circulating nitrous acid comes from the Gay-Lussac tower A through the pipe 18, and is introduced to the two sets of reaction chambers $S'$ and $S^2$ in differing degrees of strength, the nitre and water being added in the second set of reaction chambers $S^2$. The acid circulates in serial succession through the secondary chambers, where intermediate reactions take place, and move finally into the primary reaction chamber P where the completion of the reaction and the production of the final sulphuric acid is effected.

While we have shown our apparatus and process in the preferred form, it will be obvious that many changes and modifications may be made therein without departing from the spirit of the invention, defined in the following claims.

We claim:

1. The method of producing sulphuric acid which consists in reacting sulphur dioxide gas with a mixture of nitrososulphuric, sulphuric and nitric acids for denitrating the same, in then passing the excess sulphur dioxide gas and the nitrous oxides liberated during denitration through two reaction chambers in succession, the first containing a relatively concentrated nitrososulphuric acid for absorbing the bulk of the excess sulphur dioxide and the second containing a diluted nitrososulphuric acid for absorbing the residual sulphur dioxide, and in thereafter absorbing the nitrous oxides in concentrated sulphuric acid.

2. The method of producing sulphuric acid which consists in reacting sulphur dioxide gas with a mixture of nitroso-sulphuric and nitric acids in a primary reaction chamber for denitrating the same, in then bubbling the excess sulphur dioxide gas and the nitrous oxides liberated during denitration through liquids in two secondary reaction chambers in succession, the first containing a relatively concentrated nitrososulphuric acid for absorbing the bulk of the excess sulphur dioxide and the second containing a diluted nitrososulphuric acid for absorbing the residual sulphur dioxide, and in thereafter absorbing the nitrous oxides produced in the primary and secondary reaction chambers.

3. The method of producing sulphuric acid which consists in reacting sulphur dioxide gas with a mixture of nitroso-sulphuric and nitric acids for denitrating the same, in then passing the excess sulphur dioxide gas and the nitrous oxides liberated during denitration through two reaction chambers in succession, the first containing a nitrososulphuric acid having a concentration of 58° to 60° Baumé for absorbing the bulk of the excess sulphur dioxide and the second containing a nitrososulphuric acid having a concentration of 40° to 50° Baumé for absorbing the residual sulphur dioxide, and in thereafter absorbing the nitrous oxides.

4. The method of producing sulphuric acid which consists in passing sulphur dioxide through a mixture of sulphuric, nitrososulphuric and nitric acids contained in a primary reaction chamber to effect denitration of the mixture, in then passing the excess sulphur dioxide and the nitrogen compounds liberated during denitration through liquids in two secondary reaction chambers in succession, the first of which contains a relatively concentrated nitrososulphuric acid for absorbing the bulk of the excess of sulphur dioxide and the second of which contains a diluted nitrososulphuric acid for absorbing the residual sulphur dioxide, and in thereafter passing the nitrogen compounds through a concentrated sulphuric acid to effect absorption of the same.

5. The method of producing sulphuric acid which consists in passing sulphur dioxide through a mixture of sulphuric, nitrososulphuric and nitric acids contained in a primary reaction chamber to effect denitration of the mixture, in then passing the excess sulphur dioxide and the nitrogen compounds liberated during denitration through two sets of secondary reaction chambers in succession, the first set containing a relatively concentrated nitrososulphuric acid for absorbing the bulk of the excess of sulphur dioxide and the second set containing a diluted nitrososulphuric acid for absorbing the residual sulphur dioxide, and in thereafter absorbing the nitrogen compounds in a concentrated sulphuric acid.

6. The method of producing sulphuric acid which consists in reacting sulphur dioxide with a mixture of sulphuric, nitrososulphuric and nitric acids for denitrating the same, in then passing the excess sulphur dioxide and the nitrous oxides liberated during denitration first through a liquid containing a concentrated nitrososulphuric acid for absorbing the bulk of the excess sulphur dioxide and then through a liquid containing a diluted nitrososulphuric acid for absorbing the residual sulphur dioxide, and in thereafter passing the nitrous oxides through an absorption tower countercurrent to a concentrated sulphuric acid.

7. The method of producing sulphuric acid which consists in bubbling sulphur dioxide through a mixture of sulphuric, nitrososulphuric and nitric acids for denitrating the same, in then bubbling the excess sulphur dioxide and the nitrous oxides liberated during denitration first through a liquid containing a concentrated nitrososulphuric acid for absorbing the bulk of the excess sulphur dioxide and then through a liquid containing a diluted nitrososulphuric acid for absorbing the residual sulphur dioxide, and in thereafter passing the nitrous oxides through an absorption tower counter current to a concentrated sulphuric acid.

8. The method of producing sulphuric acid which consists in reacting sulphur dioxide with a mixture of nitroso-sulphuric and nitric acids in a denitrating chamber, in then passing the excess sulphur dioxide and the nitrogen compounds liberated during denitration through a plurality of reaction chambers in succession, the excess sulphur dioxide being absorbed in these reaction chambers, in then passing the nitrogen compounds through an absorption system, in introducing concentrated sulphuric acid in the absorption system for absorbing the nitrogen compounds and producing concentrated nitroso-sulphuric acid, in diluting part of the nitroso-sulphuric acid and introducing the same with nitric acid in one of the reaction chambers, in introducing the remainder of the nitroso-sulphuric acid in concentrated form in the other of the reaction chambers, and in feeding the acid mixture from the one reaction chamber to the other reaction chamber and that in the said other reaction chamber to the denitration chamber.

9. The method of producing sulphuric acid which consists in passing sulphur dioxide through a mixture of nitroso-sulphuric and nitric acids in a denitrating chamber, in then passing the excess sulphur dioxide and the nitrogen compounds liberated during denitration through the liquids in a plurality of reaction chambers in succession, the excess sulphur dioxide being absorbed by the liquids in these reaction chambers, in then passing the nitrogen compounds through an absorption system, in introducing concentrated sulphuric acid in the absorption system for absorbing the nitrogen compounds and producing concentrated nitroso-sulphuric acid, in diluting part of the nitroso-sulphuric acid and introducing the same with nitric acid and water in one of the reaction chambers, in introducing the remainder of the nitroso-sulphuric acid in concentrated form in the other of the reaction chambers, and in feeding the liquid from the one reaction chamber to the other reaction chamber and that in the said other reaction chamber to the denitration chamber.

10. The method of producing sulphuric acid which consists in generating sulphur dioxide gas, in cooling and reacting the same with a mixture of nitroso-sulphuric and nitric acids in a denitration chamber for effecting denitration and concentration, in then passing the excess sulphur dioxide and the nitrogen compounds liberated during denitration through a plurality of reaction chambers in succession, the excess sulphur dioxide being absorbed in these reaction chambers, in then passing the nitrogen compounds through an absorption system, in conducting part of the concentrated sulphuric acid produced in the denitration chamber into the absorption system for absorbing the nitrogen compounds and thereby producing concentrated nitroso-sulphuric acid, in diluting part of the nitroso-sulphuric acid and introducing the same with nitric acid in one of the reaction chambers, in introducing the remainder of the nitroso-sulphuric acid in concentrated form in the other of the reaction chambers, and in feeding the acid mixture from the one reaction chamber to the other reaction chamber and that in the said other reaction chamber to the denitration chamber.

11. The method of producing sulphuric acid which consists in oxidizing sulphur to produce sulphur dioxide gas, in cooling the gas and then passing the same through a mixture of nitroso-sulphuric and nitric acids in a denitration and concentrating chamber for effecting combined denitration and concentration of sulphuric acid, in then passing the excess sulphur dioxide and the nitrogen compounds liberated during denitration through a reaction chamber containing a mixture of nitroso-sulphuric and nitric acids, and in thereafter absorbing the nitrogen compounds in concentrated sulphuric acid.

12. The method of producing sulphuric acid which consists in oxidizing sulphur into sulphur dioxide gas, in cooling the gas and in passing the cooled gas through a mixture of nitroso-sulphuric and nitric acids in a denitrating and concentrating chamber for effecting combined denitration and concentration of the sulphuric acid, in then passing the excess sulphur dioxide and the nitrogen compounds liberated during denitration through a plurality of reaction chambers in succession, the excess sulphur dioxide being absorbed in these reaction chambers, and in then passing the nitrogen compounds through an absorption system.

13. The method of producing sulphuric acid which consists in oxidizing sulphur into sulphur dioxide gas, in cooling the gas and in passing the cooled gas through a mixture of nitroso-sulphuric and nitric acids in a denitrating and concentrating chamber for effecting combined denitration and concentration of the sulphuric acid, in then passing the excess sulphur dioxide and the nitrogen compounds liberated during denitration through a plurality of reaction chambers in succession, the excess sulphur dioxide being absorbed in these reaction chambers, in then passing the nitrogen compounds through an absorption system, in conducting part of the concentrated sulphuric acid produced in the denitration chamber into the absorption system for absorbing the nitrogen compounds and thereby producing concentrated nitroso-sulphuric acid, in diluting part of the nitroso-sulphuric acid and introducing the same with nitric acid and water in one of the reaction chambers, in introducing the remainder of the nitrous acid in concentrated form in the other of the reaction chambers, and in feeding the acid mixture from the one reaction chamber to the other reaction chamber and that in the said other reaction chamber to the denitration chamber.

14. A sulphuric acid plant comprising a denitrating or primary reaction chamber, a plurality of secondary reaction chambers, an absorption apparatus, means connecting the reaction chambers in series or cascade for delivering the acid in serial succession from the last to the first chamber, means connecting the reaction chambers also in series or cascade for conducting gases in serial succession from the first to the last chamber, means connecting the last chamber of the series with the absorption apparatus and means for introducing an acid of one concentration into one and an acid of another concentration into the other of said secondary reaction chambers.

15. A sulphuric acid plant comprising a denitrating or primary reaction chamber, a plurality of secondary reaction chambers, an absorption apparatus, means connecting the reaction chambers in series or cascade for delivering the acid in serial succession from the last to the first chamber, means connecting the reaction chambers also in series or cascade for conducting gases in serial succession from the first to the last chamber, means connecting the last chamber of the series with the absorption apparatus and means for introducing a diluted acid into the last chamber and a concentrated acid into an intermediate chamber of the series.

16. A sulphuric acid plant comprising a denitrating or primary reaction chamber, a plurality of secondary reaction chambers, an absorption apparatus, means connecting the reaction chambers in series or cascade for delivering the acid in serial succession from the last to the first chamber, means connecting the reaction chambers also in series or cascade for conducting gases in serial succession from the first to the last chamber, means connecting the last chamber of the series with the absorption apparatus, means for introducing a diluted nitrous acid and nitric acid into the last chamber and means for introducing a concentrated nitrous acid into an intermediate chamber of the series.

17. A sulphuric acid plant comprising a denitrifying or primary reaction chamber, a plurality of sets of secondary reaction chambers, an absorption apparatus, means connecting the reaction chambers in series or cascade for delivering the acid in serial succession from the last to the first chamber, means connecting the reaction chambers also in series or cascade for conducting gases in serial succession from the first to the last chamber, means connecting the last chamber of the series with the absorption apparatus, and means for introducing an acid of one concentration into one set of the secondary reaction chambers and an acid of another concentration into the other set of the secondary reaction chambers.

18. A sulphuric acid plant comprising a denitrifying or primary reaction chamber, a plurality of secondary reaction chambers, an absorption apparatus, acid ducts connecting the reaction chambers in series or cascade for delivering the acid in serial succession from the last to the first chamber, gas ducts connecting the reaction chambers also in series or cascade for conducting gases from the first to the last chamber in serial succession in contact with the acids therein, inlets connected to the secondary reaction chambers for introducing an acid of one strength into one and an acid of another strength into the other of the secondary reaction chambers, a gas conducting means connecting the last reaction chamber with the absorption system, and an acid conducting means connecting the absorption system with the said inlets.

19. A sulphuric acid plant comprising an apparatus for generating sulphur dioxide gases, a denitrifying or primary reaction chamber, a plurality of secondary reaction chambers, an absorption apparatus, a gas inlet connecting the gas generating apparatus with the primary reaction chamber, acid ducts connecting the reaction chambers in series or cascade for delivering the acid in serial succession from the last to the first chamber, gas ducts connecting the reaction chambers also in series or cascade for conducting gases from the first to the last chamber in serial succession in contact with the acids therein, inlets connected to the secondary reaction chambers for introducing an acid of one strength into one and an acid of another strength into the other of the secondary reaction chambers, a gas conducting means connecting the last reaction chamber with the absorption system, and an acid conducting means connecting the absorption system with the said inlets.

20. A sulphuric acid plant comprising a denitrating or primary reaction chamber, a plurality of secondary reaction chambers, an absorption tower, acid ducts connecting the reaction chambers in series or cascade for delivering the acid in serial succession from the last to the first chamber, gas ducts connecting the reaction chambers also in series or cascade for conducting gases from the first to the last chamber in serial succession in contact with the acids therein, inlets connected to the secondary reaction chambers for introducing an acid of one strength into one and an acid of another strength into the other of the secondary reaction chambers, a gas conducting means connecting the last reaction chamber with the bottom of the absorption tower, an acid conducting means connecting the bottom of the absorption tower with the said inlets, and means for feeding concentrated acid into the top of the tower.

21. A sulphuric acid plant comprising a sulphur burning furnace embodying a combustion chamber for producing sulphur dioxide gas and a means for cooling the gas, a concentrating and denitrifying primary reaction chamber, a secondary reaction chamber, an absorption system, means connecting the furnace with the primary reaction chamber for conducting the cooled gases from the former to the latter in contact with an acid bath therein, and means interconnecting the reaction chambers and the absorption system for conducting gases from the primary to the secondary chamber and absorption system in serial succession and for conducting acid therethrough in the reverse direction in serial succession.

Signed at Charlotte, in the county of Mecklenburg and State of North Carolina, this 14th day of December, A. D. 1923.

INGENUIN HECHENBLEIKNER.
PETER S. GILCHRIST.